INVENTOR.
HARRY HALL
BY
David W. Tibbott
ATTORNEY

Sept. 26, 1967                H. HALL                3,343,893

FLOATING BEARING OF SPLIT-SHELL CONSTRUCTION

Filed Jan. 27, 1965                                        2 Sheets-Sheet 2

INVENTOR.
HARRY HALL
BY
David W. Tillott
ATTORNEY

United States Patent Office 3,343,893
Patented Sept. 26, 1967

3,343,893
FLOATING BEARING OF SPLIT-SHELL CONSTRUCTION
Harry Hall, Painted Post, N.Y., assignor to Ingersoll-Rand Company, New York, N.Y., a corporation of New Jersey
Filed Jan. 27, 1965, Ser. No. 428,442
11 Claims. (Cl. 308—121)

This invention relates to bearings of the type characterized by split-shell construction and more particularly to the provision of a full-floating bearing of split-shell construction which includes new and improved means for the reduction of lubricant leakage adjacent the junctures of the bearing shells.

When a conventional full-floating bearing of split-shell construction is subjected to high temperatures during the operation of the engine, pump, compressor, or the like in which the bearing is employed, the bearing material customarily expands. In order to prevent bearing seizure from resulting from this expansion, clearances are generally provided between the contiguous ends of the bearing shells. These clearances are usually constructed of sufficient magnitude to permit the maximum expansion expected during the most adverse operating conditions of the bearing. Thus, although the clearances are reduced to some extent during the normal operation of the bearing, they are still of sufficient magnitude to permit an appreciable, and undesirable, escape of lubricant. The normal wear of the bearing further enlarges the clearances and increases the flow of lubricant therethrough.

An object of the present invention is to provide a new and improved means for the reduction of lubricant leakage between the shell members of a full-floating bearing of split-shell construction.

Another object of the present invention is to provide new and improved lubricant leakage reduction means of the type set forth which substantially eliminates increase in the rate of lubricant leakage between the shell members as the bearing wears.

Another object is to provide new and improved lubricant leakage reduction means of the type set forth which is relatively simple and economical both in construction and in operation.

Other objects and advantages of the invention will be apparent from the following description taken in connection with the accompanying drawings. It will be understood that changes may be made in the details of construction and arrangement of parts shown and described as the preferred forms of the invention have been given by way of illustration only.

Referring to the drawings.

Figure 7:
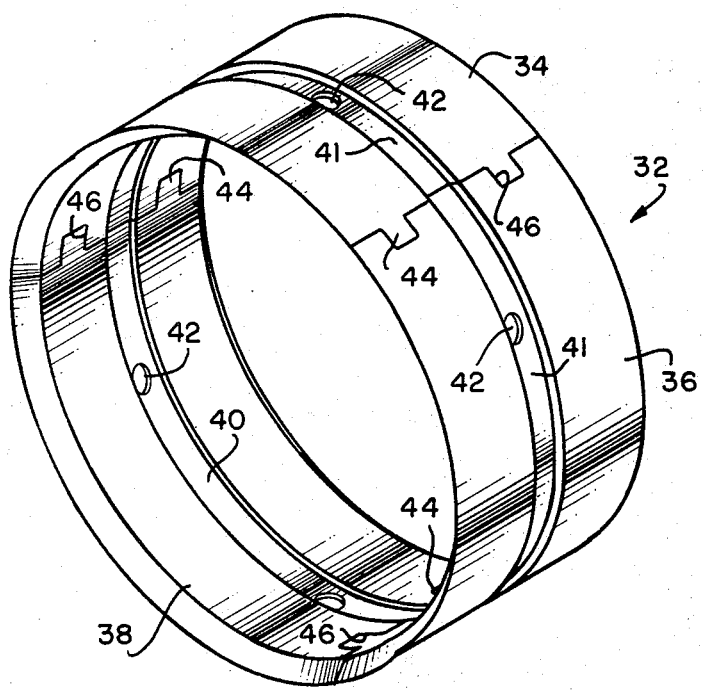
FIG. 7 is a view in perspective of a full-floating bearing of split-shell construction provided with a modified form of the lubricant leakage reduction means of the invention.

FIGS. 1 through 6 of the drawings illustrate one embodiment of the present invention as applied to a full-floating bearing of half-shell construction. FIG. 7 illustrates an alternative or modified form of the invention as applied to a full-floating bearing comprised of three bearing shells. It will be understood, however, that this difference in the number of shells included in the illustrated bearings has been shown for the purposes of illustration only. The spirit and scope of the present invention encompass all full-floating bearings of split-shell construction, regardless of the number of shells included therein.

Figures 2, 3:
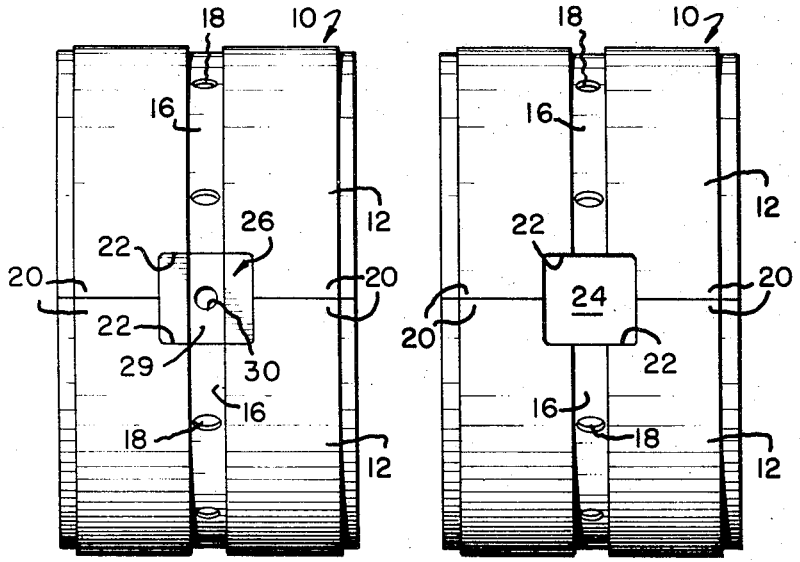
FIG. 2 is a side view of the bearing illustrated in FIG. 1.
FIG. 3 is a side view of said bearing with the lubricant leakage reduction means removed.
Figures 1, 4:
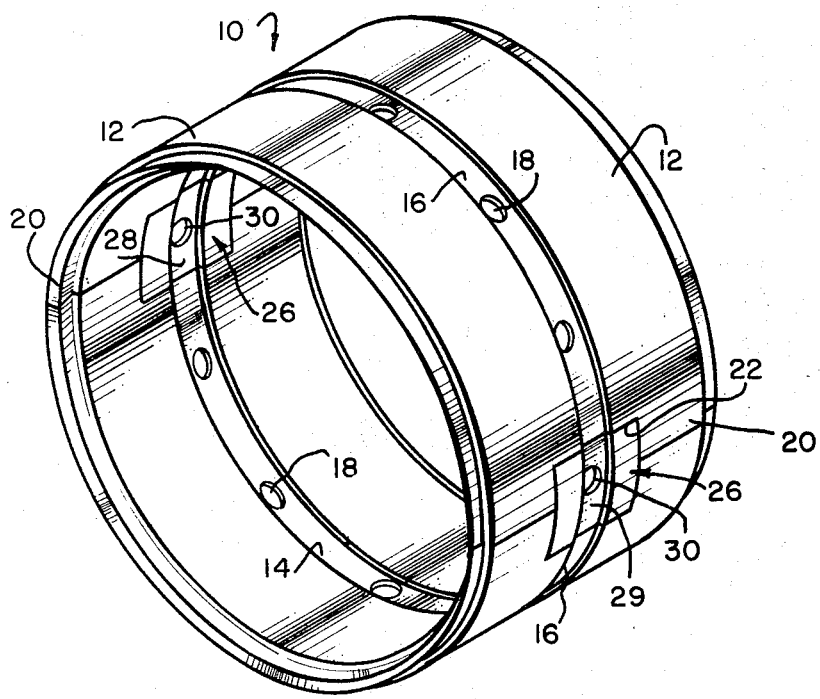
FIG. 1 is a view in perspective of a full-floating bearing constructed in accordance with the present invention.
FIG. 4 is a view in perspective of said lubricant reduction means.

Referring more particularly to the drawings wherein similar reference characters designate corresponding parts throughout the several views, and with particular reference to FIGS. 1 through 3, the split-shell type, full-floating bearing therein illustrated is designated generally at 10 and comprises the two identical bearing shell halves or members 12.

Each of the shell members 12 is provided with the centrally positioned, circumferentially disposed, internal and external, annular lubrication grooves or channels 14 and 16, respectively. The internal groove 14 in each of the shell members 12 is adapted to form an arcuately extending portion of a single continuous lubrication groove which passes internally around the bearing 10 after the assembly of the two shell members 12. Similarly, the external groove 16 in each of the shell members 12 is adapted to form an arcuate section of a single, continuous lubrication groove externally around the bearing 10 after the assembly of the shell members 12.

As illustrated, the spaced lubricant ports or openings 18 are disposed throughout the length of the grooves 14 and 16 and intercommunicate said grooves. Thus, when lubricant is supplied to the external grooves 16, a portion thereof will be conducted through the ports 18 to the internal groove 14. Similarly, when lubricant is supplied to the internal groove 14, a portion thereof will pass through the ports 18 to the external groove 16.

It will be understood, however, that the two grooves 14 and 16 have both been shown in the illustrated bearing 10 for the purposes of illustration only. More specifically, when the bearing lubricant is to be supplied to the outside of the bearing 10, such as when the bearing 10 is to be employed as a main bearing, only the external grooves 16 need be provided. However, when the lubricant is to be supplied to the inside of the bearing 10, such as when the bearing 10 is to be employed as a crankpin bearing, only the internal groove 14 need be provided.

Each of the opposing longitudinal ends of the shell members 12 is provided with a pair of parting faces 20 and a slot or cut-away portion 22 which is centrally disposed therebetween. When the shell members 12 are assembled longitudinally in end-to-end alignment to form the cylindrical bearing 10 and the position of the shell members 12 is not restricted by the presence of a journal, said shell members will butt against each other along the parting faces 20.

However, the circumferential length of the shell members 12 is so dimensioned and arranged that, when the bearing 10 is installed and is operating at normal operating temperature with the correct internal and external lubricant clearance, the shell members 12 may butt along the parting faces 20 on one of the sides of the bearing 10, but not both thereof. Thus, when the parting faces 20 butt on one side of the bearing 10, there is a small clearance between the parting faces 20 in the other side thereof. This clearance is provided for allowing thermal expansion of the shell members 12 during abnormal operation of the bearing 10.

The slots 22 upon each side of the bearing 10 are aligned and constructed and arranged, as will be seen from FIG. 3, to form a substantially square opening 24 upon assembly of the bearing shell members 12 without the closure means of the present invention.

Figure 6:
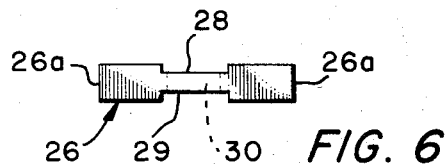
FIG. 6 is an end view of said means.
Figure 5:
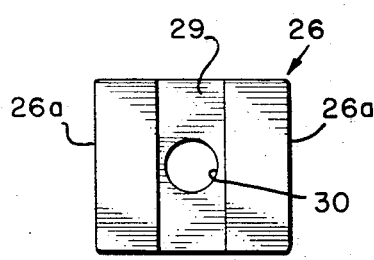
FIG. 5 is a front view of said means.

As will be seen from FIGS. 4 through 6, the closure means for filling the openings 24 comprises a key-type or similar closure member 26 which is of substantially square configuration and, while fitting snugly at its sides 26a with the shell members 12, is longitudinally of such dimensions to permit butting of the shell members 12. The closure member 26, however, may be of other suitable configuration providing that the opening 24 is of similar construction such that the closure member 26 is the beforedescribed fit.

The closure member 26, furthermore, is provided with the internal and external annular lubrication grooves or channels 28 and 29, respectively, which are constructed and arranged therein to communicate with the grooves 14 and 16 upon each of the shell members 12 after assembly of the bearing 10 to allow lubricant flow therearound. A port 30 which is similar in construction and function to the ports 18 in the shell members 12 communicates between the channels 28 and 29.

As the points of juncture between the ends of the shell members 12 and the annular grooves 14 and 16 has proven to be the points where leakage of lubricating fluid has occurred in conventional, split-shell type, full-floating bearings, it will be seen that closure member 26 greatly restricts this leakage due to its fit within the openings 24 adjacent these former points of leakage.

In the operation of the illustrated bearing 10, lubricating fluid is introduced from a pressurized source to either the continuous groove which is comprised of the grooves 14 in the shell members 12 and the grooves 28 in the closure members 26 or, alternatively, the continuous groove formed by the grooves 16 in the shell members 12 and the grooves 29 in the closure members 26. This lubricating fluid flows circumferentially on the bearing 10 and passes through the ports 18 and 30 in the shell members 12 and the closure members 26, respectively. Leakage of the lubricating fluid is greatly restricted due to the closure members 26 within the openings 24 formed adjacent the junctures of the shell members 12.

FIG. 7 of the drawings illustrates an alternative embodiment of the invention as applied to a split-shell type, full-floating bearing 32 which is comprised of the three bearing shells 34, 36, and 38.

Each of the shell members 34, 36, and 38 is provided with the internal and external annular lubrication grooves or channels 40 and 41, respectively, which are adapted to communicate with the grooves 40 and 41 in the others of said shell members. The grooves 40 and 41 are substantially similar in construction and arrangement to the grooves 14 and 16 and include lubricant ports 42 which are similar in constructions and function to the ports 18.

The shell members 34, 36, and 38 are each provided with a pair of tongue-shaped members 44 adjacent one of their ends and a pair of correspondingly contoured grooves or slots 46 adjacent the other of their ends. The tongues 44 and the slots 46 of each of said shell members are adapted to interengage with the tongues 44 and the slots 46 upon the others of said shell members such as to form a bearing 32 of tight, unitary construction.

Although the tongues 44 and the grooves 46 are illustrated in FIG. 7 as being two in number upon each of shell members 34, 36, and 38, it will be understood that this construction has been shown for purposes of illustration only. The tongues 44 and the grooves 46 may be either more or less than two in number and may, furthermore, be of any suitable configuration.

Due to this overlapping or tongue-and-groove construction, leakage of lubricating fluid between said shell members is substantially eliminated; and a bearing of leak-free construction is produced.

The operation of this embodiment of the invention is believed to be apparent from the foregoing description.

From the foregoing, it will be seen that I have provided new and improved means for accomplishing all of the objects and advantages of the invention.

I claim:

1. A full-floating bearing of split-shell construction, comprising:
   a plurality of separate arcuate shell members having inner and outer bearing surfaces and longitudinally disposed in end-to-end alignment in the configuration of a cylindrical bearing shell and having abutting longitudinal end portions;
   groove means in said shell members cooperating for conveying lubricating fluid around the bearing shell formed by said shell members;
   means for connecting said shell members in said configuration of a cylindrical bearing shell; and
   said connecting means comprising a slot in a longitudinal end portion of one of said shell members, and tongue means operatively associated with the abutting longitudinal end portion of the adjacent shell member and fitting snugly in said slot.

2. A full-floating bearing according to claim 1 wherein said tongue means comprises a key member.

3. A full-floating bearing according to claim 2 wherein said key member is formed independently of said shell members and the adjacent abutting longitudinal end portions of at least two of said shell members include aligned slots, said key member being disposed in said aligned slots in a snug fit.

4. A full-floating bearing according to claim 1 wherein said tongue means is formed integrally with said abutting longitudinal and portion of said adjacent shell member.

5. A full-floating bearing according to claim 1 wherein said tongue means includes a groove for directing and conveying lubricating fluid communicating with said groove means in said space shell member to form a continuous, circumferential fluid passage around the bearing shell.

6. A full-floating bearing of split-shell construction, comprising:
   a plurality of separate arcuate shell members having inner and outer bearing surfaces and longitudinally disposed in end-to-end alignment in the configuration of a cylindrical bearing shell and having contiguous longitudinal end portions;
   groove means in said shell members cooperating for conveying lubricating fluid on and through the bearing shell formed by said shell members;
   means for connecting adjacent shell members to maintain said shell members in said configuration of a cylindrical bearing shell; and
   said connecting means including a slot formed in one of the longitudinal end portions of each of said shell members, and a closure member operatively associated with the longitudinal end portion of each of the shell members contiguous to said longitudinal end portions containing said slots, said closure members being disposed within said slots in snug fits and permitting longitudinal expansion of said shell members.

7. A full-floating bearing according to claim 6 wherein said closure members are each a key member separate from said shell members, and the contiguous longitudinal end portions of said shell members are provided with aligned slots.

8. A full-floating bearing according to claim 6 wherein said closure members are formed integral with the longitudinal end portion of said contiguous, shell members, and extend arcuately therefrom.

9. A full-floating bearing according to claim 6 wherein said lubricating fluid directing and conveying means include means on said shell members for transporting lubricating fluid circumferentially about the bearing shell and port means through said shell members for supplying the lubricating fluid through the bearing shell.

10. A full-floating bearing according to claim 9 wherein said closure members include groove means for conveying lubricating fluid on the bearing shell.

11. A full-floating bearing according to claim 6 wherein said closure members include port means for supplying lubricating fluid through the bearing shell.

References Cited

UNITED STATES PATENTS

| | | |
|---|---|---|
| 98,172 | 12/1869 | Lloyd. |
| 2,566,080 | 8/1951 | Davids. |
| 2,851,316 | 9/1958 | Thomson _____ 308—238 |

MARTIN P. SCHWADRON, *Primary Examiner.*

FRANK SUSKO, *Examiner.*